United States Patent
Han

(10) Patent No.: US 9,282,317 B2
(45) Date of Patent: Mar. 8, 2016

(54) METHOD AND APPARATUS FOR PROCESSING AN IMAGE AND GENERATING INFORMATION REPRESENTING THE DEGREE OF STEREOSCOPIC EFFECTS

(75) Inventor: Hee-chul Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 447 days.

(21) Appl. No.: 13/104,101

(22) Filed: May 10, 2011

(65) Prior Publication Data

US 2012/0033043 A1 Feb. 9, 2012

(30) Foreign Application Priority Data

Aug. 6, 2010 (KR) .................. 10-2010-0075981

(51) Int. Cl.
*H04N 13/02* (2006.01)
*G06T 7/00* (2006.01)

(52) U.S. Cl.
CPC .......... *H04N 13/0239* (2013.01); *G06T 7/0051* (2013.01)

(58) Field of Classification Search
CPC .............. H04N 13/02; H04N 13/0239; H04N 13/0242; H04N 13/0292; H04N 5/23293; H04N 5/23238; H04N 5/23245; G06T 7/0051
USPC ............................................. 348/46
See application file for complete search history.

(56) References Cited

U.S. PATENT DOCUMENTS

| | | | |
|---|---|---|---|
| 5,666,566 A * | 9/1997 | Gu et al. | 396/80 |
| 6,512,892 B1 * | 1/2003 | Montgomery et al. | 396/326 |
| 2008/0158346 A1 * | 7/2008 | Okamoto et al. | 348/47 |
| 2010/0231688 A1 * | 9/2010 | Park et al. | 348/42 |
| 2011/0032252 A1 * | 2/2011 | Ohta | 345/419 |
| 2012/0113216 A1 * | 5/2012 | Seen et al. | 348/38 |

FOREIGN PATENT DOCUMENTS

EP 1617684 A1 * 1/2006
JP 2010086228 A * 4/2010

* cited by examiner

*Primary Examiner* — Jayanti Patel
*Assistant Examiner* — Francis G Geroleo
(74) *Attorney, Agent, or Firm* — Sughrue Mion, PLLC

(57) ABSTRACT

A method and apparatus for processing an image are provided. The method includes obtaining an image, generating 3-dimensional (3D) disparity information that represents a degree of stereoscopic effects of the image, and outputting the 3D disparity information.

29 Claims, 6 Drawing Sheets (a)　　　　　　　　　　　(b)

METHOD AND APPARATUS FOR PROCESSING AN IMAGE AND GENERATING INFORMATION REPRESENTING THE DEGREE OF STEREOSCOPIC EFFECTS

CROSS-REFERENCE TO RELATED PATENT APPLICATION

This application claims the benefit of Korean Patent Application No. 10-2010-0075981, filed on Aug. 6, 2010, in the Korean Intellectual Property Office, the disclosure of which is incorporated herein in its entirety by reference.

BACKGROUND

1. Field

The exemplary embodiments described below relate to a method and an apparatus for processing an image, and more particularly, to a method and apparatus for processing an image including generating information representing the degree of stereoscopic effects of an image and outputting the information.

2. Description of the Related Art

With the development of digital technologies, images processed using 3-dimensional (3D) techniques have come into wide use.

Since human eyes are separated from each other by a predetermined distance, the left and right eyes see objects at different angles. The difference in images between the left eye and the right eye refers to binocular parallax. The brain combines two different 2-dimensional (2D) images, i.e., an image for the left eye and an image for the right eye, to form a 3D image with perspective and a sense of presence.

A 3D camera forms two images in which the image difference of both eyes is reflected. Our left and right eyes respectively see the image for the left eye and the image for the right eye, which are formed by the 3D camera, to recognize a 3D image.

SUMMARY

According to an aspect of one or more embodiments, there is provided a method and an apparatus for processing an image by which information displaying the degree of stereoscopic effects of an image is generated.

According to an aspect of one or more embodiments, there is provided a method of processing an image, the method including: obtaining an image; generating 3-dimensional (3D) information that represents the degree of stereoscopic effects of the image; and outputting the 3D information.

A focus of the image may be adjusted to a first subject, and the step of generating 3D information may include: calculating a distance to the first subject; obtaining depth information of the image; and generating 3D information using the distance to the first subject and the depth information. Calculating a distance to the first subject may include emitting infrared rays or ultrasonic waves to the first subject and calculating the distance to the first subject using the infrared rays or ultrasonic waves reflected by the first subject.

The image may display auto focusing (AF) points indicating a second subject, and obtaining depth information of the image may include calculating a distance to the second subject indicated by the AF points. Calculating the distance to the second subject may include emitting infrared rays or ultrasonic waves to the second subject and calculating the distance to the second subject using the infrared rays or ultrasonic waves reflected by the second subject. Obtaining depth information of the image may include: generating a depth map of the image; and calculating the distance to the second subject displayed in the image using the depth map.

Calculating the distance to the second subject may include calculating the distance to the second subject using the brightness of pixels of the depth map. Generating 3D information using the distance to the first subject and the depth information may include: calculating at least one of a first probability indicating degrees that a distance between the first subject and the second subject is within a first reference range and a second probability indicating degrees that the distance to the first subject and the distance to the second subject are within a second reference range; adding weights to the at least one of the first and second probabilities; and generating 3D information using the probabilities to which the weights are added.

Generating 3D information using the probabilities to which the weights are added may include generating a graph indicating the probabilities to which the weights are added as the 3D information. The image displays information indicating that a focus may be focused on the first subject with a first color, and generating 3D information using the probabilities to which the weights are added may include generating information indicating that the focus is focused on the first subject as the 3D information with a second color that is different from the first color when the probabilities to which the weights are added are not greater than a threshold.

Generating 3D information using the probabilities to which the weights are added may include generating an audio signal as the 3D information when the probabilities to which the weights are added are not greater than a threshold. The method may further include displaying an arrow upwards and downwards with respect to the focused first subject. The method may further include setting the first reference range by the user. The method may further include setting the second reference range by the user.

According to another aspect, there is provided an apparatus for processing an image including: an image obtaining unit that obtains an image; a 3-dimensional (3D) information generating unit that generates 3D information representing the degree of stereoscopic effects of the image; and an output unit that outputs the 3D information.

According to another aspect, there is provided a computer-readable recording medium having recorded thereon a program for executing a method of processing an image, wherein the method includes: obtaining an image; generating three-dimensional (3D) information that represents the degree of stereoscopic effects of the image; and outputting the 3D information.

BRIEF DESCRIPTION OF THE DRAWINGS

The above and other aspects will become more apparent by describing in detail exemplary embodiments thereof with reference to the attached drawings in which.

DETAILED DESCRIPTION OF THE INVENTION

Hereinafter, exemplary embodiments will now be described more fully with reference to the accompanying drawings.

Figure 1:
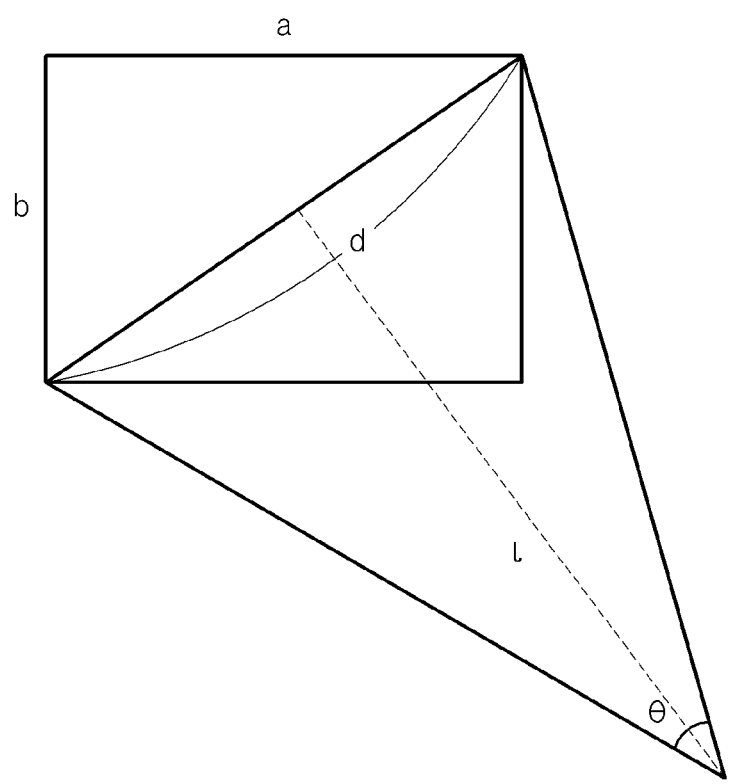
FIG. 1 is a diagram for describing the relationship between a distance to a subject and a wide angle when photographing a subject.

FIG. 1 is a diagram for describing the relationship between a distance of a subject and a wide angle when photographing a subject. A rectangle shown in FIG. 1 is a viewfinder for observing an image of a subject to photograph or adjust a focus, a and b are respectively a width and a length of the viewfinder, d is a length of a diagonal line of the viewfinder, L is a distance between a camera and the subject, and $\Theta$ is a wide angle.

In this regard, $\tan(\Theta/2)=[d/2]/L$, and $\Theta=2*\tan^{-1}(d/2*L)$. If d is 6.6 cm, the relationship between 1 and 0 is shown in Table 1 below.

TABLE 1

| L | 25 cm | 1 m | 2 m | 3 m | 5 m | 10 m |
|---|---|---|---|---|---|---|
| $\Theta$ | 15.04° | 3.78° | 1.89° | 1.26° | 0.756° | 0.378° |

As shown in Table 1, as the subject is closer to the camera, the wide angle increases. When the wide angle increases, the eyes concentrate on the middle to observe the subject. If the wide angle is greater than a predetermined level, the brain cannot recognize an object viewed as an image for the left eye and an image for the right eye as the same object. Although there are differences among individuals, people generally feel dizzy when the wide angle is greater than 2°, which is beyond the image-combining ability of the brain.

On the other hand, if the distance between the subject and the camera is greater than a predetermined level and thus the wide angle is less than a predetermined level, our eyes become parallel, so that the subject is not recognized as a 3D image but as a 2D image.

In other words, if the camera is too close to or too far from the subject, it is difficult to form an image with a stereoscopic feeling.

In general, a user is unaware of the distance between the camera and the subject necessary to obtain a 3D image with a high stereoscopic feeling. According to an exemplary embodiment, the camera may generate information indicating whether the subject is positioned within a range to obtain an image with a high stereoscopic feeling and provide the information to the user. The user may adjust the distance between the camera and the subject using the information provided by the camera to obtain an image with a desired stereoscopic feeling.

For example, the distance between the subject and the camera needed to obtain for a high stereoscopic feeling, thought not limited thereto, may be in the range of 1 to 10 m. Since the distance for the high stereoscopic feeling may vary according to user, the desired distance for a high stereoscopic feeling may be set by the user.

Figure 2:
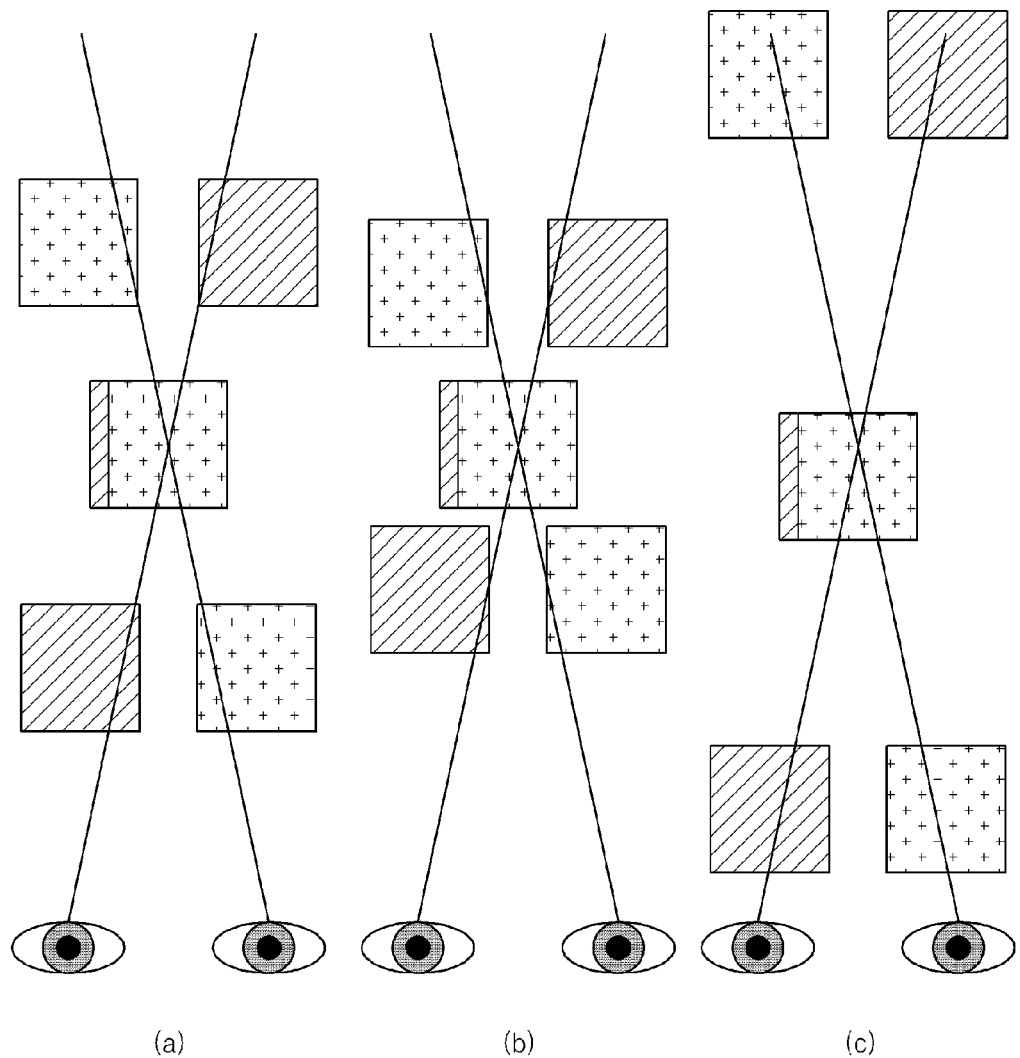
FIG. 2 is a diagram for describing stereoscopic perceptual changes according to the distance among subjects when photographing a plurality of subjects.

FIG. 2 is a diagram for describing stereoscopic feeling changes according to the distance among subjects when photographing a plurality of subjects.

Contrast refers to a difference in visual characteristics which distinguish one object from another object or a background. The contrast may be determined by the difference between colors and brightness of objects.

The contrast may also be determined by the difference in depth feeling of objects. For example, when a plurality of subjects, which are spaced apart from one another by a predetermined distance in the gaze direction, are photographed to form an image, contrast may be determined according to the distance among the subjects. Hereinafter, a contrast according to a depth of a subject refers to a disparity contrast.

Three subjects with different depth feelings according to the gaze direction are arranged in FIG. 2(*a*). The user may have different stereoscopic feelings according to the distance among the subjects. That is, the user can recognize more easily that each subject has different depth when the distance among the subjects is within a predetermined range.

The subjects disposed closer than those of FIG. 2(*a*) are shown in FIG. 2(*b*), and the subjects disposed farther than those of FIG. 2(*a*) are shown in FIG. 2(*c*). If the distance among the subjects is less than a predetermined level, the user may not recognize the difference in depth of the three subjects, i.e., disparity contrast. In addition, if the distance among the subjects is greater than a predetermined level, the user may not recognize the disparity contrast of the three subjects, either.

In general, the user is unaware of the distance among the subjects to obtain a 3D image with a high stereoscopic feeling. According to an exemplary embodiment, the camera informs the user of the distance among the subjects to obtain an image with a high stereoscopic feeling. For this, the camera generates information indicating whether the distance among the subjects is within a predetermined range to obtain a high stereoscopic feeling and outputs the information. The user may adjust the distance among the subjects using the information provided by the camera to form an image having a desired stereoscopic feeling.

The distance range among the subjects to obtain a high stereoscopic feeling may vary according to user. Thus, according to an exemplary embodiment, the user may set the distance range among the subjects to obtain a high stereoscopic feeling.

Figure 3:
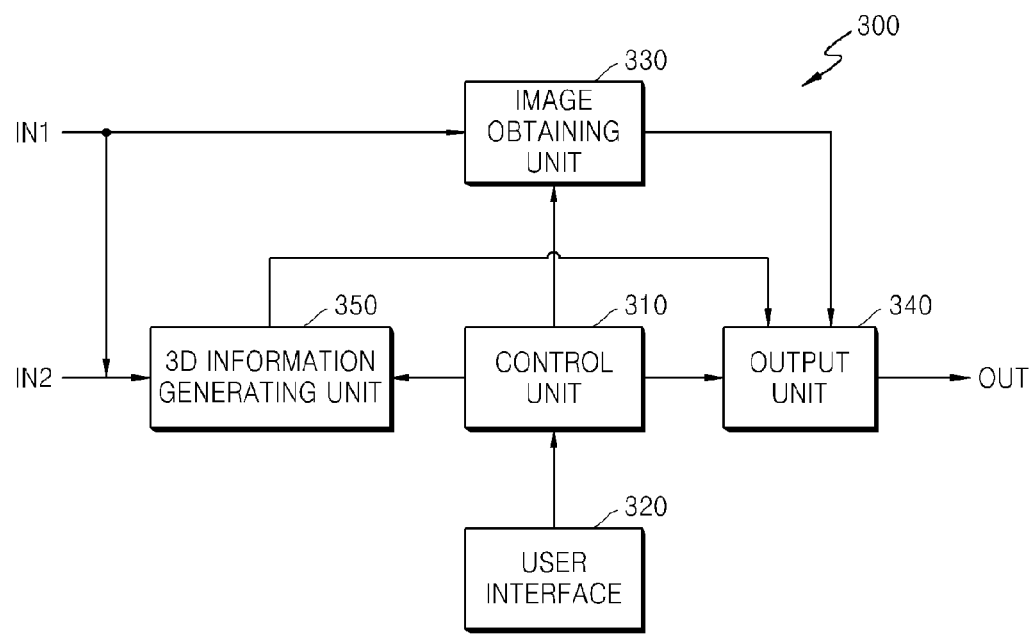
FIG. 3 is a block diagram of an image processing apparatus according to an exemplary embodiment.

FIG. 3 is a block diagram of an image processing apparatus 300 according to an exemplary embodiment. Referring to FIG. 3, the image processing apparatus 300 includes a control unit 310, a user interface 320, an image obtaining unit 330, an output unit 340, and a 3D information generating unit 350.

The term "unit," as used herein, means, but is not limited to, a software or hardware component, such as a Field Programmable Gate Array (FPGA) or an Application Specific Integrated Circuit (ASIC), which performs certain tasks. A unit may advantageously be configured to reside in the addressable storage medium and to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented so as to execute one or more Central Processing Units (CPUs) in a device.

The image processing apparatus 300 is an apparatus for photographing a subject and may include a camcorder, a camera, a personal digital assistant (PDA), a portable media player (PMP), a mobile phone, a smart phone, and a navigator having camera function, and a laptop computer, such as an ultra mobile PC (UMPC).

The user interface 320 receives instructions, characters, numbers, or voice information from the user and sends the information to the control unit 310.

The control unit 310 controls a general operation of the image processing apparatus 300 according to the user's request to generate 3D image information. The control unit 310 includes an arithmetic logic unit (ALU) for performing calculations and registers for temporarily storing data and instructions.

The image obtaining unit 330 includes a lens, or the like, to obtain an image of the subject. The image obtaining unit 330 sends the obtained image to the output unit 340. Upon a user's request of photographing the obtained image, the image obtaining unit 330 captures the image to generate a media signal, such as a photograph or a video image.

According to an exemplary embodiment, the image obtaining unit 330 may have an auto focusing (AF) function. The AF function is a function for automatically adjusting a focus on a subject. The AF function may be performed by using infrared rays, using a phase difference of the subject, or by detecting a contrast.

The output unit 340 outputs a general state of the image processing apparatus 300 or information input by the user using the user interface 320. The output unit 340 may include a viewfinder (not shown) that outputs a video signal, such as a video image or a photograph, among the media signal. The user may look at the viewfinder of the output unit 340 to photograph or adjust the focus. The output unit 340 may further include a speaker (not shown) for outputting an audio signal, in addition to the viewfinder, and an OSD processing unit (not shown) that generates and outputs a user terminal control list.

If the image obtaining unit 330 performs an AF function and adjusts the focus, the viewfinder may display points to perform the AF function. In general, the focus is adjusted to the center of the viewfinder by the AF function, but a plurality of AF points may be used to adjust the focus.

The 3D information generating unit 350 generates 3D information. The 3D information is information representing the degree of stereoscopic effects of an image by indicating the disparity contrast among the subjects and/or indicating whether the subject is within a uniform wide angle range. The 3D information may be calculated using the distance to the subject viewed via the output unit 340.

The 3D information generating unit 350 calculates the distance to the focused subject. Hereinafter, the focused subject is referred to as a first subject, and another subject other than the first subject among the subjects of the image is referred to as a second subject.

According to an exemplary embodiment, the 3D information generating unit 350 may emit infrared rays or ultrasonic waves to the first subject and calculate the distance to the first subject using the infrared rays or ultrasonic waves reflected by the first subject.

If the image obtaining unit 330 performs an infrared ray AF function, the 3D information generating unit 350 may emit infrared rays to the focused first subject and calculate the distance to the first subject using the infrared rays reflected by the first subject.

The 3D information generating unit 350 calculates depth information of an image. The 3D information generating unit 350 may generate a depth map using a 3D depth sensor or a stereo matching technique to obtain depth information of an image. The depth map may also be referred to as a depth image.

According to the 3D depth sensor, infrared rays or laser beams are emitted to a subject displayed in the image, and the time taken for the infrared rays or laser beams to return from the subject is measured to calculate the distance to the subject. According to the stereo matching technique, the distance to the subject is measured using an interval between an image for the left eye and an image for the right eye.

The 3D information generating unit 350 may identify the second subject displayed in the image using the brightness of pixels of the depth map. According to an exemplary embodiment, the 3D information generating unit 350 segments the depth map to identify the second subject and calculates the distance to the second subject using the brightness of pixels of the depth map corresponding to the second subject. According to another exemplary embodiment, the 3D information generating unit 350 may calculate the distance to the second subject using the brightness of specific pixels of the depth map.

Instead of generating the depth map, the 3D information generating unit 350 may calculate the distance to the second subject using AF points. If the image obtaining unit 330 performs the AF function using infrared rays, the viewfinder of the output unit 340 may display a plurality of AF points. The 3D information generating unit 350 emits infrared rays to the second subject indicated by the AF points displayed on the viewfinder and calculates the actual distance to the second subject using the infrared rays reflected by the second subject. In this case, the distance to the second subject may be calculated by carrying out less operations than using a 3D depth sensor or stereo matching technique.

The 3D information generating unit 350 generates 3D information using the distance to the first subject and the distance to the second subject. The 3D information generating unit 350 calculates the distance between the first subject and the second subject using the distance to the first subject and the distance to the second subject. The 3D information generating unit 350 may calculate a probability indicating whether a difference between the distance to the first subject and the distance to the second subject, i.e., contrast differences between the first subject and the second subject, is within a first reference range. Hereinafter, the probability indicating degrees that the disparity contrast difference between the first subject and the second subject is within a predetermined reference range is referred to as a first probability.

The 3D information generating unit 350 may calculate a probability indicating degrees that both the first subject and the second subject are within a second reference range using the distance to the first subject and the distance to the second subject. Hereinafter, a probability indicating degrees that all subjects displayed on the image, i.e., the distances to the first subject and the second subject, are within the second reference range refers to a second probability.

The 3D information generating unit 350 may generate 3D information using at least one of the first and second probabilities. The 3D information generating unit 350 may add weights to the at least one of the first and second probabilities, wherein the weights are positive real numbers, and generate 3D information using the probabilities to which the weight are added.

In this regard, the 3D information generated by the 3D information generating unit 350 may be calculated using Equation 1 below.

$$A = \alpha P + \beta b \qquad \text{Equation 1}$$

In Equation 1, A is 3D information numerically expressed, P is a first probability, and B is a second probability. In addition, α and β are weights respectively.

The 3D information generating unit 350 sends the generated 3D information to the output unit 340. The output unit 340 may output the 3D information with an image received from the image obtaining unit 330. The output unit 340 outputs a graph illustrating the 3D information by overlaying the graph on the image. Alternatively, the output unit 340 may represent the degree of stereoscopic effects of the image using the AF points with a color different from the original color of the AF points. For example, if the original color of the AF points is green, the output unit 340 may display the AF points with a red color when the stereoscopic feeling of the 3D information is not greater than a threshold, i.e., the degree of stereoscopic effects of the image is low, to inform the user of the degree of 3D stereoscopic feeling.

Alternatively, the output unit 340 may output an audio signal when the degree of stereoscopic effects of the image is low to inform the user of the degree of stereoscopic effects.

The recognition of the stereoscopic feeling may vary according to users. Accordingly, the first reference range for calculating the first probability may be set by the user using the user interface 320. The second reference range for calculating the second probability may also be set by the user using the user interface 320. The user may also set a threshold to determine whether the 3D information generated using the first and second probabilities is greater than the threshold using the user interface 320.

According to an exemplary embodiment, the image processing apparatus 300 may generate 3D information that represents the degree of stereoscopic effects of an image using the distance to the subject or the distance between subjects. In addition, according to an exemplary embodiment, the image processing apparatus 300 displays the 3D information in the viewfinder or outputs an audio signal to inform the user of the degree of stereoscopic effects.

Figure 4:
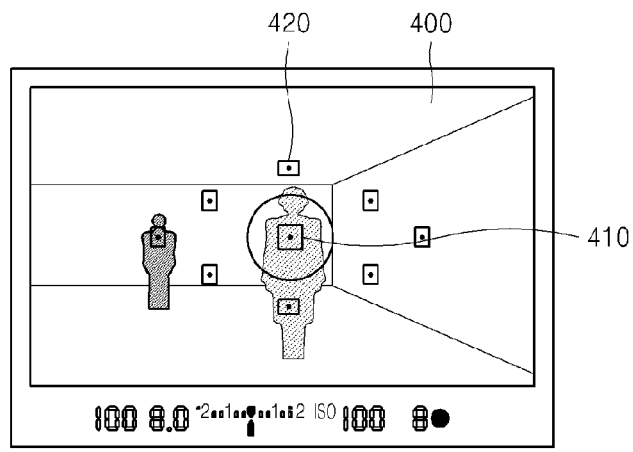
FIG. 4 is a diagram for describing the distance to a subject calculated by an image processing apparatus of FIG. 3 using an auto focusing (AF) point displayed in a viewfinder.

FIG. 4 is a diagram for describing the distance to a subject calculated by the image processing apparatus 300 of FIG. 3 using an auto focusing (AF) point displayed in a viewfinder.

Referring to FIG. 4, an image 400 is displayed in the viewfinder, and a plurality of AF points 410 and 420 are shown in the image 400. The user may focus on the first subject using the central AF point 410 formed in the viewfinder.

If the image processing apparatus 300 performs the AF function using infrared rays, the image processing apparatus 300 may calculate the distance to the first subject and the distance to the second subject using the AF points 410 and 420 displayed in the image 400.

For this, the image processing apparatus 300 may emit infrared rays to spots indicated by the AF points 410 and 420 displayed in the viewfinder and calculate the distances to the spots using the infrared rays reflected by the spots.

The image processing apparatus 300 may generate 3D information using the distance to the first subject and the distance to the second subject.

Figure 5:
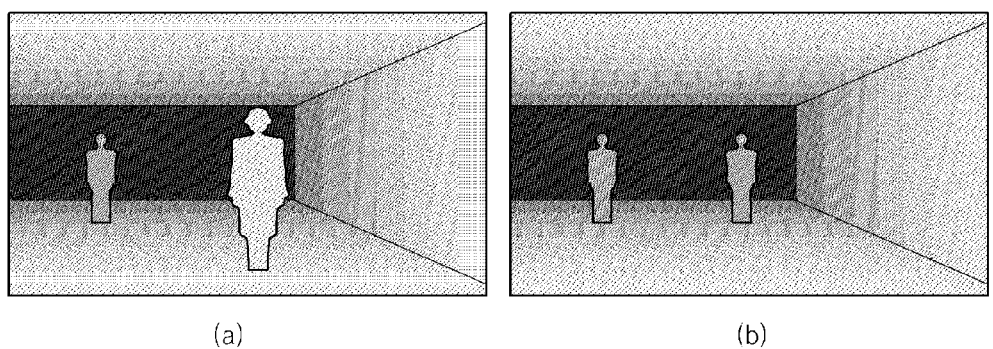
FIG. 5 is a diagram for describing the distance to a subject calculated by the image processing apparatus of FIG. 3 using a depth map.

FIG. 5 is a diagram for describing the distance to a subject calculated by the image processing apparatus 300 of FIG. 3 using a depth map.

Referring to FIG. 5, the image processing apparatus 300 may generate a depth map using a 3D depth sensor or stereo matching technique to obtain depth information of an image. The depth map is an image indicating distance information using the brightness with a gray level in the range of 0 to 255 according to a perspective of the subject. In a depth map, white is close to the user and black is far from the user.

The 3D information generating unit 350 may identify the subjects displayed in the image using the brightness of pixels of the depth map. Depth maps created for images including two persons, i.e., two subjects, are shown in FIGS. 5(a) and (b).

Referring to FIGS. 5 (a) and (b), the two subjects have a brightness different from that of the backgrounds. The 3D information generating unit 350 may identify the two subjects using the pixel brightness of the depth map. The 3D information generating unit 350 may also calculate the actual distance to the subjects using the pixel brightness of the identified subjects.

In FIG. 5(a), two subjects have different brightness. In FIG. 5(b), two subjects have the same brightness. Accordingly, there is no difference between the distances to the two subjects of the depth map shown in FIG. 5(b), and there is a difference between the distances to the two subjects of the depth map shown in FIG. 5(a).

The 3D information generating unit 350 may identify the focused subject between the two subjects and generate 3D information using the distance to the focused subject and the distance to the unfocused subject.

Figure 6:
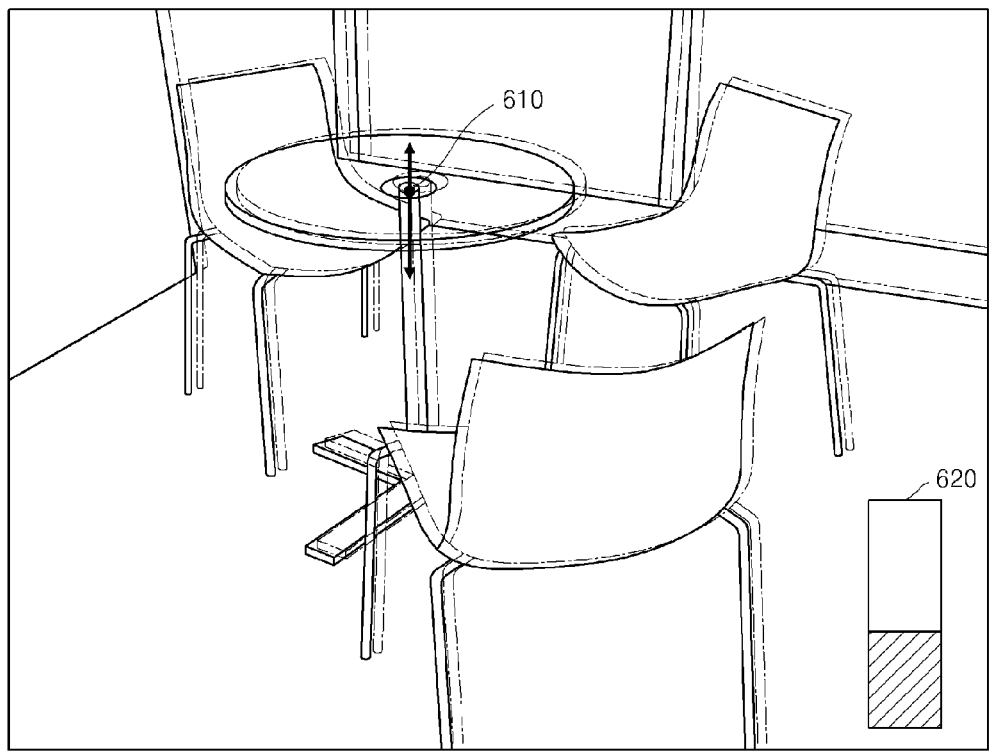
FIG. 6 shows 3D information output to an image according to an exemplary embodiment.

FIG. 6 shows 3D information output to an image according to an exemplary embodiment.

According to an exemplary embodiment, the image processing apparatus 300 may generate a graph 620 using 3D information and display the graph 620 in the output unit 340. The graph 620 may express the degree of stereoscopic effects using a ratio of oblique lines. In other words, if the 3D information shows the highest degree of stereoscopic effects, the entire graph 620 is shown with the oblique lines.

According to an exemplary embodiment, the image processing apparatus 300 may output an audio signal indicating the degree of stereoscopic effects of the image. That is, if the degree of stereoscopic effects of the 3D information is less than a threshold, i.e., if the degree of stereoscopic effects is low, the image processing apparatus 300 may output an audio signal.

According to an exemplary embodiment, the image processing apparatus 300 may output the AF points with a different color from that of the original AF points if the degree of stereoscopic effects of the 3D information is less than a threshold.

According to an exemplary embodiment, the image processing apparatus 300 may also output information for indicating a focused spot. FIG. 6 shows an arrow 610 that is used to indicate the focused spot. The user may recognize the focused spot using the arrow 610 and may have a stereoscopic feeling that a portion of the image below the arrow 610 protrudes and the other portion of the image above the arrow 610 is recessed.

Accordingly, the user may identify the stereoscopic feeling of the obtained image using information and/or 3D information indicating the focused spot and adjust the distance between the subjects or the distance between the camera and the subject to obtain a desired stereoscopic feeling.

Figure 7:
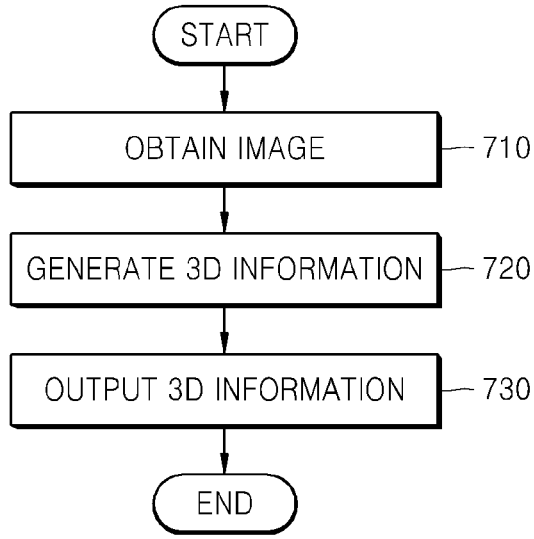
FIG. 7 is a flowchart of a method of processing an image, according to an exemplary embodiment.

FIG. 7 is a flowchart of a method of processing an image, according to an exemplary embodiment. Referring to FIG. 7, the image processing apparatus 300 obtains an image (operation 710). In the image obtained by the image processing apparatus 300, a focus is adjusted to a first subject.

The image processing apparatus 300 calculates the distance to the first subject and depth information of the image and generates 3D information using the calculated distance and depth information (operation 720). The image processing apparatus 300 outputs the generated 3D information to the viewfinder or the speaker (operation 730).

Figure 8:
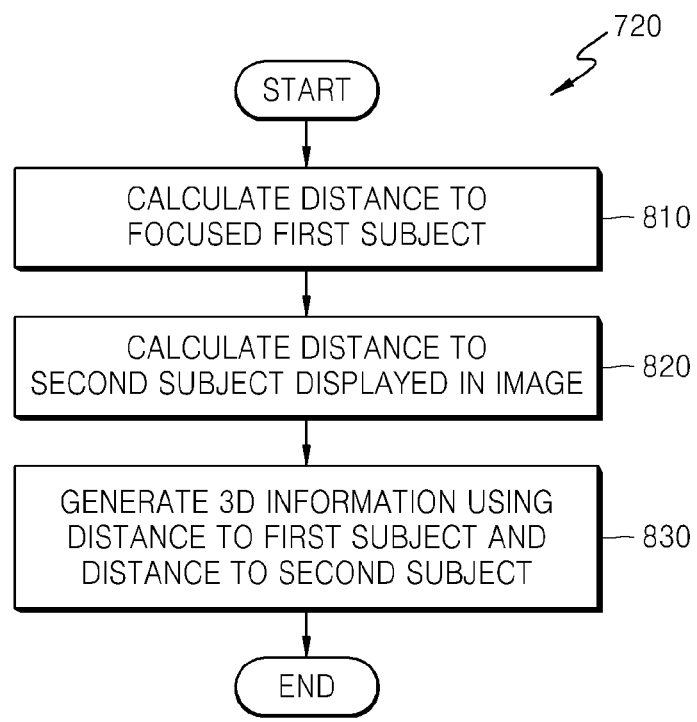
FIG. 8 is a flowchart of an operation in the method of processing an image of FIG. 7.

FIG. 8 is a flowchart of operation 720 in the method of processing an image of FIG. 7. Referring to FIG. 8, the image processing apparatus 300 calculates a distance to the focused first subject (operation 810). The image processing apparatus 300 emits infrared rays or ultrasonic waves to the first subject and calculates the distance to the first subject using the infrared rays or ultrasonic waves reflected by the first subject.

The image processing apparatus 300 calculates the distance to the second subject (operation 820). If the image processing apparatus 300 adjusts the focus using infrared rays AF, the image processing apparatus 300 may calculate the distance to the second subject indicated by an AF point displayed in the viewfinder using the infrared rays AF.

Alternatively, the image processing apparatus 300 may generate a depth map of the image and identify the distance to the second subject using the depth map.

The image processing apparatus 300 generates 3D information using the distance to the first subject and the distance to the second subject (operation 830).

Figure 9:
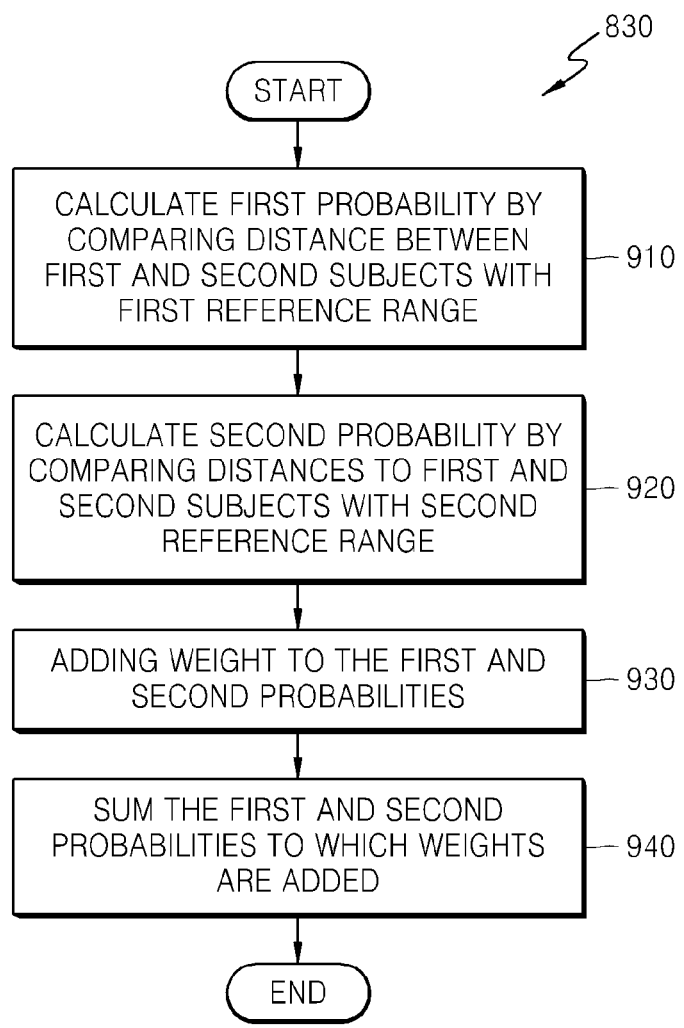
FIG. 9 is a flowchart of an operation of FIG. 8 in the method of processing an image.

FIG. 9 is a flowchart of operation 830 of FIG. 8 in the method of processing an image. The image processing apparatus 300 calculates a first probability by comparing the distance between the first subject and the second subject with a first reference range (operation 910).

The image processing apparatus 300 calculates a second probability by comparing the distance to the first subject and the distance to the second subject with a second reference range (operation 920).

The image processing apparatus 300 adds weights to the first probability and the second probability (operation 930). In this regard, the weight may be a positive real number. The image processing apparatus 300 sums the first probability and the second probability to which weights are added to generate 3D information (operation 940).

While exemplary embodiments have been particularly shown and described, it will be understood by those of ordinary skill in the art that various changes in form and details may be made therein without departing from the spirit and scope of the present invention as defined by the following claims.

What is claimed is:

1. A method of processing an image by an image processing apparatus, the method comprising:
obtaining an image to be photographed;
adjusting a focus of the image to a first subject and a second subject;
generating 3-dimensional (3D) information that represents a numerical degree of three or more numerical degrees of stereoscopic effects of the image based on distances respectively between the image processing apparatus and at least two objects in the image and depth information of the image; and
outputting the 3D information to inform the numerical degree of stereoscopic effects of the image to be photographed to a user before capturing the image, and to guide the user to obtain an image which has a desired stereoscopic feeling,
wherein the step of generating 3D information comprises:
calculating the first distance between the image processing apparatus and the first subject;
calculating a second distance between the image processing apparatus and the second subject indicated by the AF points;
calculating at least one of a first probability indicating a degree to which a distance between the first subject and the second subject is within a first reference range, and a second probability indicating a degree to which the first distance and the second distance are within a second reference range;
calculating at least one of a weighted first probability and a weighted second probability by multiplying weights by the at least one of the first and second probabilities, respectively; and
generating 3D information using the at least one of the weighted first and second probabilities.

2. The method of claim 1, wherein calculating the first distance comprises emitting infrared rays or ultrasonic waves to the first subject and calculating the first distance using infrared rays or ultrasonic waves reflected by the first subject.

3. The method of claim 1, wherein the calculating the second distance comprises emitting infrared rays or ultrasonic waves to the second subject and calculating the second distance using the infrared rays or ultrasonic waves reflected by the second subject.

4. The method of claim 1, wherein calculating the second distance comprises:
generating a depth map of the image; and
calculating the second distance using the depth map.

5. The method of claim 4, wherein the calculating the second distance comprises calculating the second distance using brightness of pixels of the depth map.

6. The method of claim 5, wherein calculating the second distance comprises calculating the second distance using brightness of pixels corresponding to the second subject in the depth map.

7. The method of claim 1, wherein the generating 3D information using the at least one of the weighted first and second probabilities comprises generating a graph indicating the at least one of the weighted first and second probabilities as the 3D information.

8. The method of claim 1, further comprising generating information indicating that a focus is focused on the first subject with a first color; wherein
the generating 3D information using the at least one of the weighted first and second probabilities comprises generating information indicating that the focus is focused on the first subject as the 3D information with a second color that is different from the first color if a sum of the weighted first and second probabilities are not greater than a threshold.

9. The method of claim 1, wherein the generating 3D information using the at least one of the weighted first and second probabilities comprises generating an audio signal as the 3D information when a sum of the weighted first and second probabilities are not greater than a threshold.

10. The method of claim 1, further comprising displaying an arrow upwards and downwards with respect to the focused first subject.

11. The method of claim 1, further comprising receiving a user input for setting the first reference range; and
setting the first reference range according to the user input.

12. The method of claim 1, further comprising receiving a user input for setting the second reference range; and
setting the second reference range according to the user input.

13. The method of claim 1, wherein the outputting the 3D information comprises outputting the 3D information via a viewfinder.

14. The method of claim 1, wherein the outputting the 3D information comprises outputting the 3D information via a speaker.

15. An apparatus for processing an image comprising:
an image obtaining unit that obtains an image to be photographed;
a 3-dimensional (3D) information generating unit that generates 3D information representing a numerical degree of three or more numerical degrees of stereoscopic effects of the image based on distances respectively between the imaging processing apparatus and at least two objects in the image and depth information of the image; and
an output unit that outputs the 3D information to inform the numerical degree of stereoscopic effects of the image to be photographed to a user before capturing the image, and to guide the user to obtain an image which has a desired stereoscopic feeling,
wherein the focus of the image is adjusted to a first subject, and the obtained image includes auto focusing (AF) points indicating a second subject, and
wherein the 3D information generating unit configured to:
calculate the first distance between the image processing apparatus and the first subject;
calculate a second distance between the image processing apparatus and the second subject indicated by the AF points;
calculate at least one of a first probability indicating a degree to which a distance between the first subject and the second subject is within a first reference range and a second probability indicating a degree to which the first distance and the second distance are within a second reference range;
calculate at least one of a weighted first probability and a weighted second probability by multiplying weights by the at least one of the first and second probabilities, respectively; and
generate 3D information using the at least one of the weighted first and second probabilities.

16. The apparatus of claim 15, wherein the 3D information generating unit emits infrared rays or ultrasonic waves to the first subject and calculates the first distance using infrared rays or ultrasonic waves reflected by the first subject.

17. The apparatus of claim 15, wherein the 3D information generating unit emits infrared rays or ultrasonic waves to the second subject to calculate the second distance and calculates the second distance using infrared rays or ultrasonic waves reflected by the second subject.

18. The apparatus of claim 15, wherein the 3D information generating unit generates a depth map of the image and calculates the second distance using the depth map.

19. The apparatus of claim 18, wherein the 3D information generating unit calculates the second distance using brightness of pixels of the depth map.

20. The apparatus of claim 18, wherein the 3D information generating unit calculates the second distance using brightness of pixels corresponding to the second subject in the depth map.

21. The apparatus of claim 15, wherein the 3D information generating unit generates a graph indicating the at least one of the weighted first and second probabilities as the 3D information.

22. The apparatus of claim 15, wherein the image includes information indicating that a focus is focused on the first subject with a first color, and
the 3D information generating unit generates information indicating that the focus is focused on the first subject as the 3D information with a second color that is different from the first color when a sum of the weighted first and second probabilities are not greater than a threshold.

23. The apparatus of claim 15, wherein the 3D information generating unit generates an audio signal as the 3D information when a sum of the weighted first and second probabilities are not greater than a threshold.

24. The apparatus of claim 15, wherein the output unit displays an arrow upwards and downwards with respect to the focused first subject.

25. The apparatus of claim 15, further comprising a user interface that receives a user input for setting the first reference range, and sets the first reference range according to the user input.

26. The apparatus of claim 15, further comprising a user interface that receives a user input for setting the second reference range, and sets the second reference range according to the user input.

27. The apparatus of claim 15, wherein the output unit comprises a viewfinder that outputs the 3D information.

28. The apparatus of claim 15, wherein the output unit comprises a speaker that outputs the 3D information.

29. A non-transitory computer-readable recording medium having recorded thereon a program for executing a method of processing an image, wherein the method comprises:
obtaining an image to be photographed;
adjusting a focus of the image to a first subject and a second subject;
generating 3-dimensional (3D) information that represents a numerical degree of three or more numerical degrees of stereoscopic effects of the image based on distances respectively between the image processing apparatus and at least two objects in the image and depth information of the image; and
outputting the 3D information to inform the numerical degree of stereoscopic effects of the image to be photographed to a user before capturing the image, and to guide the user to obtain an image which has a desired stereoscopic feeling,
wherein the step of generating 3D information comprises:
calculating the first distance between the image processing apparatus and the first subject;
calculating a second distance between the image processing apparatus and the second subject indicated by the AF points;
calculating at least one of a first probability indicating a degree to which a distance between the first subject and the second subject is within a first reference range, and a second probability indicating a degree to which the first distance and the second distance are within a second reference range;
calculating at least one of a weighted first probability and a weighted second probability by multiplying weights by the at least one of the first and second probabilities, respectively; and generating 3D information using the at least one of the weighted first and second probabilities.

* * * * *